US012614307B2

(12) United States Patent
Blixt et al.

(10) Patent No.: US 12,614,307 B2
(45) Date of Patent: Apr. 28, 2026

(54) METHOD AND SYSTEM FOR DETERMINING A CURRENT GAZE DIRECTION

(71) Applicant: TOBII AB, Danderyd (SE)

(72) Inventors: Peter Blixt, Danderyd (SE); Mårten Selin, Danderyd (SE)

(73) Assignee: Tobii AB, Danderyd (SE)

( * ) Notice: Subject to any disclaimer, the term of this patent is extended or adjusted under 35 U.S.C. 154(b) by 398 days.

(21) Appl. No.: 18/212,227

(22) Filed: Jun. 21, 2023

(65) Prior Publication Data

US 2023/0410367 A1 Dec. 21, 2023

(30) Foreign Application Priority Data

Jun. 21, 2022 (SE) .................................... 2250757-8

(51) Int. Cl.
*G06T 7/80* (2017.01)
*G06F 3/01* (2006.01)
(Continued)

(52) U.S. Cl.
CPC ................ *G06T 7/80* (2017.01); *G06F 3/013* (2013.01); *G06T 7/13* (2017.01); *G06T 7/62* (2017.01);
(Continued)

(58) Field of Classification Search
CPC .... G06T 7/80; G06T 7/13; G06T 7/62; G06T 2207/20084; G06T 2207/30201; G06T 2207/20081; G06T 2207/30041; G06T 2207/30208; G06T 7/73; G06T 7/60; G06F 3/013; G06F 3/0304; G06V 10/454;
(Continued)

(56) References Cited

U.S. PATENT DOCUMENTS

| | | | |
|---|---|---|---|
| 2003/0123027 A1 | 7/2003 | Amir et al. | |
| 2013/0120712 A1* | 5/2013 | Spasovski .............. | A61B 3/113 351/209 |
| 2019/0250705 A1 | 8/2019 | Zhang et al. | |

FOREIGN PATENT DOCUMENTS

| | | |
|---|---|---|
| EP | 3656285 A1 | 5/2020 |
| WO | 2014155133 A1 | 10/2014 |
| WO | 2015154882 A1 | 10/2015 |

OTHER PUBLICATIONS

Swedish search report completed Jun. 21, 2023 regarding patent application SE 2250757-8.

* cited by examiner

*Primary Examiner* — Molly Wilburn

(74) *Attorney, Agent, or Firm* — Christopher Ignatius Moylan

(57) ABSTRACT

Method for determining calibration information in relation to a digital camera used to depict a user in a system for determining a user gaze point in relation to an entity, the method comprising: receiving from the camera at least one image of a user; performing digital image processing on the image to determine an in-image feature size dimension of a feature of the entity as reflected in an eye of the user; and to determine an in-image limbus size dimension of a limbus of the eye; determining a current distance between the eye and the entity based on said in-image size dimensions, a curvature of the eye cornea, a physical limbus size and a physical feature size; and determining said calibration information in the form of a focal length and/or a field of view of the camera based on said current distance and said physical limbus size dimension.

17 Claims, 7 Drawing Sheets

(51) Int. Cl.
  *G06T 7/13*    (2017.01)
  *G06T 7/62*    (2017.01)

(52) U.S. Cl.
  CPC ............... *G06T 2207/20084* (2013.01); *G06T*
            *2207/30201* (2013.01)

(58) Field of Classification Search
  CPC ...... G06V 10/82; G06V 40/166; G06V 40/19;
       G06V 40/193; G06V 40/60; G02B
                27/0093
  See application file for complete search history.

| S0 | Start |
| S1 | Receive calibration image |
| S2 | Determine in-image feature size and in-image limbus size |
| S3 | Determine viewing distance |
| S4 | Determine calibration information |
| S5 | End |

| T0 | Start |
| T1 | Determine/recieve/fetch calibration information |
| T2 | Receive detection image |
| T3 | Determine facial measure |
| T4 | Determine gaze point |
| T4 | End |

METHOD AND SYSTEM FOR DETERMINING A CURRENT GAZE DIRECTION

CROSS-REFERENCE TO RELATED APPLICATION

The present application claims priority to Swedish patent application No. 2250757-8, filed on 21 Jun. 2022, entitled "Method and System for Determining a Current Gaze Direction," and is hereby incorporated by reference in its entirety.

TECHNICAL FIELD

The present invention relates to a method for determining a current gaze point of a user in relation to an entity, such as a computer screen. The invention also relates to a system and to a computer program product for performing such a method.

In particular, the present invention relates to the calibration of a camera used to perform gaze detection with respect to the gaze of a user onto such an entity. Accrued calibration information can then be used to determine a gaze point of the user in question, on the entity in question.

BACKGROUND OF INVENTION

It is known to detect an eye and its point of gaze. This can be done, for example, by illuminating a region in which the eye is sought with infrared radiation close to coaxially with the camera; capturing an image of the region; and detecting bright spots in the image that derive from the pupil and cornea of the eye. This approach exploits the bright-eye or "red-eye" effect known to photographers, whereby light enters the eye and is reflected or absorbed and re-emitted through the pupil, making the pupil appear brighter than the rest of the eye and the face. A separate, smaller bright spot (also referred to as a glint) is created by the cornea. The relative positions of the pupil and the corneal glint can be used to determine the direction of the gaze of the eye. More details are given in U.S. Pat. No. 6,152,563 B.

Other approaches, for example, without using this "glint" information, are also known. For instance, U.S. Ser. No. 10/671,890 B, discloses the use of deep learning methods to determine a current gaze direction, or EP 343316 B, discusses geometrical approaches exploiting an estimated pupil centre position in the eye of the gazing user.

Such gaze tracking technology may be implemented in a remote gaze tracker located adjacent a display, for example.

Such gaze tracking technology can be used to determine if a user is looking at a particular object or at an area on a screen. This could be as part of a game, for example, allowing users to interact with images on a screen by looking at them (the act of looking at the image having a predetermined result) or by a combination of looking at an image and another control (e.g., a user pressing a key on a keyboard or mouse whilst their gaze is directed at the image). Gaze tracking technology, however, has wide applicability, and can for instance be used in a video conference solution as a way to detect where on a video conferencing screen the participating user is currently directing her gaze.

Many computer screens are already equipped with cameras, or an already-existing camera may be connected as a peripheral device to a computer. Hereinafter, such cameras are jointly referred to as web cameras. It would be desirable to be able to use such web cameras for eye-tracking.

However, such web cameras generally have certain properties that may be necessary to know for eye-tracking processing, such properties not necessarily being known to an eye-tracking processor. Hence, when for instance using a video conference service, a web camera used to depict a user participating in such video conference may also be used to track the user's gaze on the screen display used for the video conference, but the properties of such a camera are not sufficiently known to perform eye-tracking.

Namely, web cameras may have different fields of view, such as ranging from about 35° to about 60°, and different resolutions, such as ranging from 640×360 to 3840×2160 (or even more) pixels. Since this information about the web camera may not be readily available for an eye-tracking software function component running on a computer connected to the web camera, it is a challenge to translate a detected eye direction into a location on the screen.

Since the face of a depicted user looks approximately the same at a long distance using a camera with narrow field of view as at a close distance using a different camera with large field of view, it is not easy to use the size of facial features of the user to deduce more information about the geometry of the user in relation to the screen.

Corresponding problems may arise in other situations, such as when using a web camera for gathering attention information in a market research use case. Corresponding problems also arise with other types of cameras. For instance, a user may want to use an existing camera, that may not be a web camera but that has at least partly unknown properties, for gaze detection.

The present invention aims to overcome at least some of these problems.

SUMMARY OF INVENTION

Hence, the invention relates to a method for determining calibration information in relation to a digital camera, the digital camera being used to depict a second user in a system for determining a gaze point of the second user in relation to an entity, the method comprising receiving from the digital camera at least one calibration image, being a depiction of at least one eye of a first user, wherein the first user may be the same as or different from the second user;

performing digital image processing on the calibration image to locate and determine an in-image feature size dimension of a feature of the entity as reflected in said eye of the first user; and to locate a limbus of said eye of the first user and determine an in-image limbus size dimension of said limbus;

determining a current distance between the eye of the first user and the entity based on said in-image feature size dimension, said in-image limbus size dimension, a curvature of the cornea of the eye of the first user, a physical limbus size dimension of the eye of the first user and a physical size of the feature; and determining said calibration information in the form of a focal length and/or a field of view of the digital camera based on said current distance and said physical limbus size dimension.

This allows for a calibration of the digital camera based solely on the calibration image, without having to require the first user to orient herself in a very specific manner and without any a priori information about the focal length or field of view of the calibrated digital camera.

The invention also relates to a method for detecting a current gaze point of a second user on an entity, this method comprising determining calibration information with respect to a digital camera, the determining of calibration information being as described above;

receiving from the digital camera at least one tracking image, being a depiction of at least one eye of the second user;

performing digital image processing on the tracking image to locate and determine a facial measure, of a facial feature of the second user, the facial feature being visible in said tracking image; and detecting said current gaze point of the second user based on a detected gaze direction of the second user, said facial measure, said calibration information and a spatial interrelationship between the digital camera and the entity.

This way, the calibration information can be used when using the calibrated digital camera for eye-tracking of the second user, that may be the same or different from the first user.

In some embodiments, such a method further comprises determining a current distance between the eye of the second user and the entity based on said facial measure, said calibration information and a spatial interrelationship between the digital camera and the entity; and the current gaze point of the second user may then be determined based on said detected gaze direction of the second user and said current distance between the eye of the second user and the entity.

In some embodiments, said facial measure is selected from a group: a corneal reflection, a face landmark, an inter-pupil distance, a limbus size, and a sclera size.

In some embodiments, said in-image feature size dimension and said in-image limbus size dimension are both measured in terms of a number of pixels of the calibration image.

In some embodiments, said digital image processing performed on the calibration image comprises an edge detection step or feature detection step using interpolation between intensity measures of individual adjacent pixels in the calibration image so as to detect the in-image feature size dimension and/or said in-image limbus size dimension with sub-pixel precision.

In some embodiments, said physical limbus size dimension is a physical distance, such as expressed in mm.

In some embodiments, the feature covers at least 50% of the entity and has high contrast in relation to other parts of the entity.

Alternatively, the feature may cover 100% of the entity and may then have high brightness.

This way, a simple way to calibrate the digital camera using an existing screen of an electronic display is achieved, since the physical size of such a screen is typically known.

In some embodiments, the feature has a rectangular shape with straight, sharp edges.

Alternatively, the feature may be in the form of a known coarse pattern comprising between 2 and 10 fields that in turn have straight, sharp edges.

This way, an automatic calibration can be achieved with higher confidence.

In some embodiments, the entity is a screen of an electronic display.

In some embodiments, the feature is deliberately displayed on the screen as a part of a digital camera calibration information determining step.

Alternatively, the feature may be constituted by the screen showing a generally bright full screen background with only a small number of pixels constituting a foreground; the method may comprise controlling the digital camera to depict said at least one eye repeatedly to produce a series of calibration images; and the feature may be automatically detected, using digital image processing, as a present, generally rectangular, bright reflected shape in said eye in at least one of the hence produced calibration images.

This way, an automatic calibration can be achieved not at all requiring any active participation by the first user.

In some embodiments, the method may further comprise using a trained neural network, trained using a set of possible screen contents occurring during use of at least one computer, to perform said automatic detection of the feature.

In some embodiments, the method may further comprise using a trained neural network to determine an expected limbus size dimension based on the calibration image, the calibration image depicting the face of the first user; and using the expected limbus size dimension as said physical limbus size dimension.

In some embodiments, a distance between the eye of the first user and the digital camera is between 30 and 80 cm when the calibration image is produced.

In some embodiments, a focal plane of the digital camera may be arranged in a main viewing plane of the entity±5 cm perpendicularly to said main viewing plane.

Moreover, the invention relates to a system for determining a gaze point of a second user in relation to an entity using a digital camera, the system comprising a calibration module, arranged to determine calibration information in relation to the digital camera by receiving from the digital camera at least one calibration image, being a depiction of at least one eye of a first user, wherein the first user may be the same as or different from the second user;

performing digital image processing on the calibration image to locate and determine an in-image feature size dimension of a feature of the entity as reflected in said eye of the first user; and to locate a limbus of said eye of the first user and determine an in-image limbus size dimension of said limbus;

determining a current distance between the eye of the first user and the entity based on said in-image feature size dimension, said in-image limbus size dimension, a curvature of the cornea of the eye of the first user, a physical limbus size dimension of the eye of the first user and a physical size of the feature; and determine said calibration information in the form of a focal length and/or a field of view of the digital camera based on said current distance and said physical limbus size dimension.

Such a system further comprises a gaze point detection module, arranged to detect a current gaze point of a second user, the second user being the first user or a different user, by receiving from the digital camera a digital tracking image depicting at least one eye of the second user;

performing digital image processing on the tracking image to locate and determine a facial measure, of a facial feature of the second user, the facial feature being visible in said tracking image; and detecting said current gaze point of the second user based on a detected gaze direction of the second user, said facial measure, said calibration information and a spatial interrelationship between the digital camera and the entity.

Moreover, the invention relates to a computer program product comprising instructions which, when the program is executed by a computer, cause the computer to carry out the steps of a method of the above type.

The computer program product may be implemented by a non-transitory computer-readable medium encoding instructions that cause one or more hardware processors located in at least one computer hardware device in a system of said type to perform the method steps in question. The computer program product may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

In the following, the invention will be described in detail, with reference to exemplifying embodiments of the invention and to the enclosed drawings, wherein:

BRIEF DESCRIPTION OF DRAWINGS

FIG. 10$b$ is a chart illustrating an edge-detecting procedure performed with respect to the image shown in FIG. 10$a$.

In all Figures, same reference numerals refer to corresponding parts.

DETAILED DESCRIPTION

As mentioned, the digital camera used for eye-tracking may have properties that are not known to an eye-tracking computer program component operating based on digital images of an eye-tracked user, the images being provided by the digital camera in question. In particular, the focal length and the field of view of the digital camera may not be known. In order to detect a gaze point on an entity (such as a display), a distance needs to be determined from the user to the entity. Given the unknown digital camera properties, it is difficult to use facial features for estimating this distance, as discussed above.

The inventors have realised that the human cornea and limbus have sufficiently uniform properties, across different users, so as to be able to use such properties to estimate said focal length or field of view of the digital camera used to depict the user in question. Then, the distance between the user and the display can be determined based on the estimated digital camera properties in question.

It is known, that the human cornea acts as a convex mirror with a focal length of typically 3.9 mm (half the radius of curvature of the cornea), with very limited variation over broad human populations. The human limbus diameter also has a very limited variation over broad populations. Since the size of a visual feature of the entity (such as the size of a computer screen or other display) is generally known (or can be made known to a digital camera calibration function), the inventors have realized that one can calculate the distance between the user's eye to the digital camera by measuring the image size of the feature as reflected in the user's eye.

In general, in a camera calibration step according to the present invention, the focal length or field of view of the calibrated digital camera is determined using said reflection in the user's eye of a known-sized visual feature of the entity. Once calibrated, the digital camera can be used for eye-tracking of the same or different users, using the digital camera for which the calibration was performed.

Figure 1:
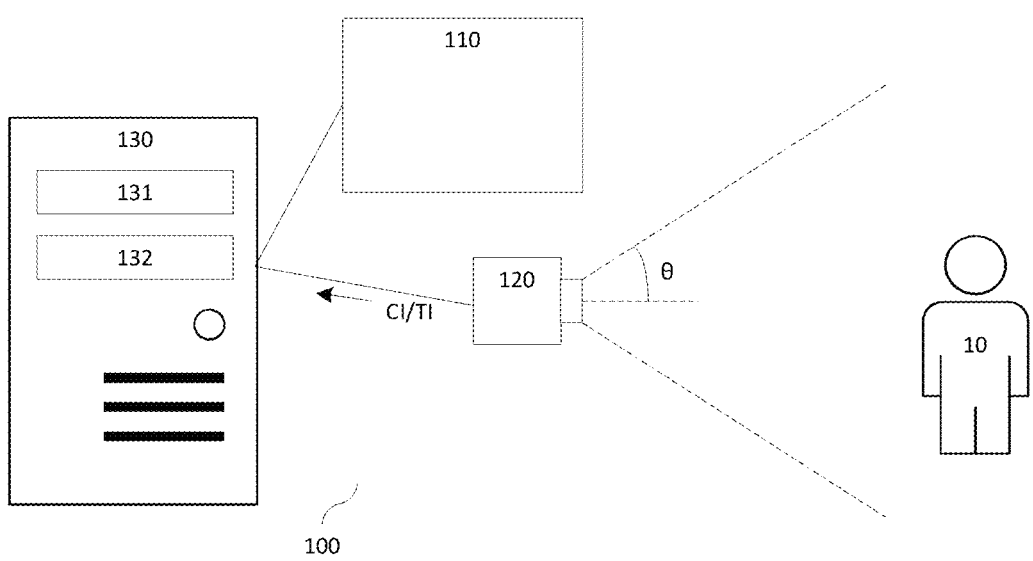
FIG. 1 illustrates a system arranged to perform a method according to the present invention.

FIG. 1 illustrates a system 100 according to the present invention, adapted for performing a method according to the present invention. The system 100 comprises a computer or server 130, which may comprise physical and/or virtual computer hardware, such as one or several CPUs; one or several GPUs; RAM memory; internal/external digital communication means, such as a computer BUS and internet connection circuitry; and so forth, as is conventional as such. The computer 130 may also comprise one or several (interconnected) such virtual and/or physical computing entities. In some embodiments, the computer 130 is a locally installed, physical computer, connected for wireless or wired local communication (such as using ethernet, Bluetooth®, WiFi, HDMI, and so forth) with a digital camera 120 and/or an entity 110 of the below-described type, such as having a display 115 (preferably an electronic display, see FIG. 2). In other embodiments, the computer 130 is a remote computer, arranged for communication with said digital camera 120 and/or entity 110 using a remote communication means, such as using an internet connection. In other embodiments, the computer 130 comprises locally arranged hardware, locally connected to said digital camera 120 and/or said display 110, and also being in communication with a remote computer arranged to perform some or all of the functions described herein. It is understood that any combination of such configurations, or other types of configurations, is possible. For instance, the computer 130 (or part thereof) and/or the digital camera and/or the entity 110 may be integrated into the same physical piece of hardware.

In general, the computer 130 is arranged to execute, on said physical and/or virtual hardware, a computer program product comprising computer software instructions arranged to, when executed on said hardware, perform a method according to the present invention. In particular, the computer software instructions are arranged to perform the method steps described herein.

As illustrated in FIG. 1, the computer 130 comprises a calibration module 131, arranged to perform a calibration of the digital camera 120 as described herein; and a tracking module 132, arranged to perform an eye-tracking using the digital camera 120 as described herein.

Further generally, the present invention is foreseen to be embodied in a mixture of hardware and software. For instance, the digital camera 120 is a physical (hardware) camera, at least as concerns optical components, and the entity 110 is in the form of a piece of hardware. The method steps described herein may be performed using software, as described above, but may at least partly also be embodied in customized hardware circuitry performing some or all of the method steps.

Hence, when reference is made herein to the computer 130, this is to be interpreted as hardware of the computer 130 and/or a software function component (computer program product) executing on the computer 130, as the case may be.

As illustrated in FIG. 1, the system 100 may also comprise, or at least use, the digital camera 120. At any rate, the computer 130 is connected for digital communication with the digital camera 120, so that an image captured by the digital camera 120 can be communicated from the digital camera 120 to the computer 130 for digital image processing. The digital camera 120 may be a web camera in the above-defined sense. Its properties at least in terms of focal length and viewing angle are generally unknown to the computer 130 before the below-described calibration step. As is conventional as such, the digital camera 120 may comprise a shutter, a lens and a light sensor. The light sensor comprises individual pixel light sensors corresponding to pixels in a captured image, whereby each depicted digital image is defined in terms of incident captured light in relation to each individual such pixel. The light sensor may be a greyscale or colour sensor. Each digitally stored image that is captured this way may be digitally processed by the digital camera 120 before provided to the computer 130, such as being converted to grayscale, pixel resolution-adjusted or com-pressed. Similarly, the computer 130 may perform such processing steps with respect to each captured image before such pre-processed image is used in the calibration and/or eye-tracking method steps described herein.

As is shown in FIG. 1, the digital camera 120 is oriented so as to capture at least an eye of the user 10, preferably at least the entire face of the user 10. This is true both during calibration and eye-tracking.

The system 100 furthermore comprises, or at least uses, the physical entity 110 with respect to which a gaze point of the user 10 is to be detected during eye-tracking as described herein.

The entity 110 may be a display device capable of displaying different visual impressions, such as images, to the user 10. For instance, the display device may be a projected image provided by a projector; a billboard or similar; and so on. In preferred embodiments, the entity 110 is in communication with the computer 130, so that the computer 130 can cause the entity 110 to display a specified image to the user 10.

Figure 2:
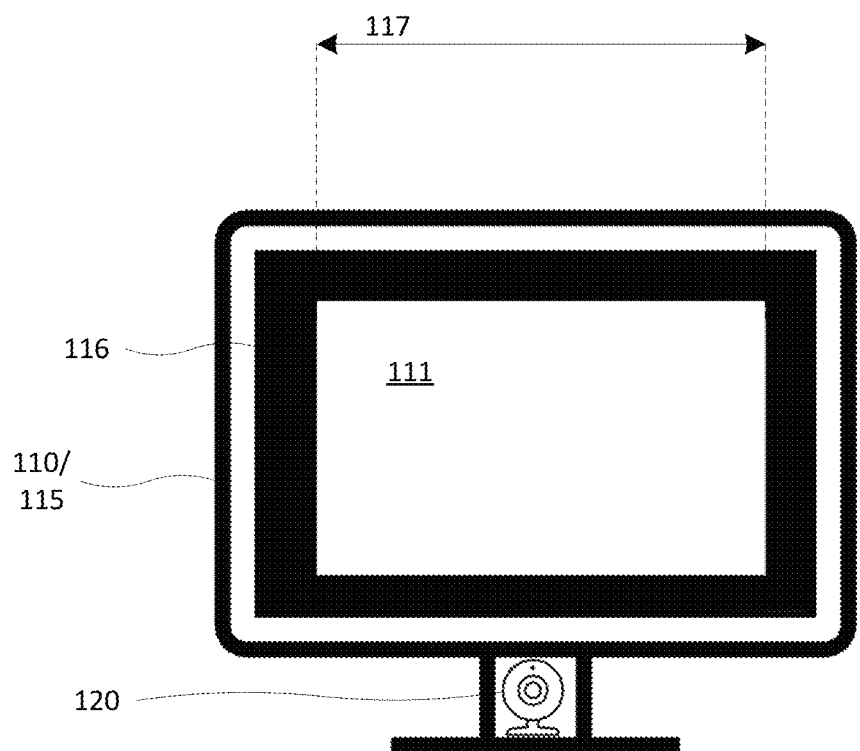
FIG. 2 illustrates an electronic computer display and a digital camera.

In some embodiments, the entity 110 is a computer display 115 having a screen 116 (FIG. 2).

Figure 3:
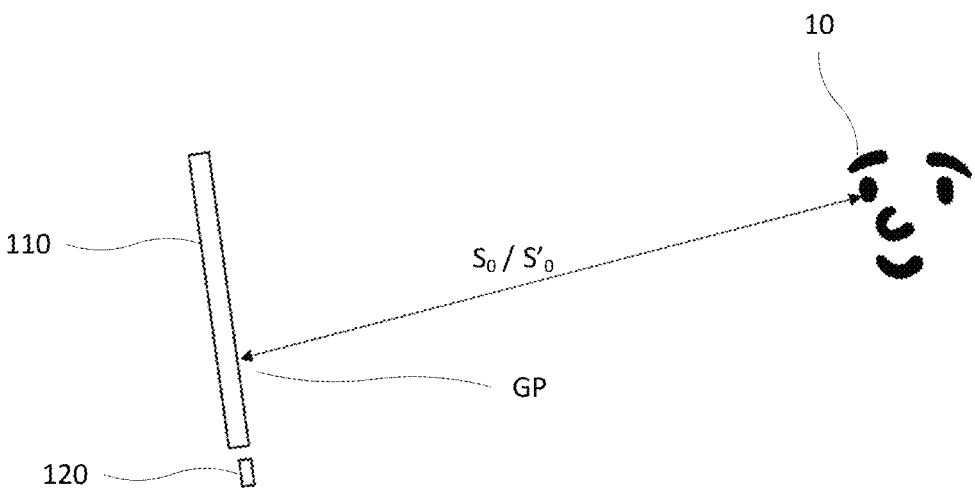
FIG. 3 illustrates a geometric relationship between a user, an entity and a digital camera.

As is illustrated in FIGS. 2 and 3, the digital camera 120 may be arranged so that an aperture or focal plane of the digital camera 120 is arranged roughly in a main viewing plane of the entity 110, in other words a main plane of a part of the entity 110 in relation to which the user's gaze is to be determined in the form of a gaze point GP on the entity 110. Expressed differently, a focal plane of the digital camera 120 may be arranged in a main viewing plane of the entity 110, ±5 cm perpendicularly to said main viewing plane. This causes a distance between the digital camera 120 and the user's 10 eye to be at least approximately the same as a distance between the entity 110 and the user's 10 eye. This information can be used by an eye-tracking function performed by the computer 130 to determine a current gaze point GP of the user onto the entity 110. The main plane/main viewing plane may be perpendicular to a gaze direction of the user 10 towards the entity 110.

In this and other embodiments, a relative orientation and location of the digital camera 120 in relation to the entity 110 may be known, and the digital camera 120 may be fixedly or movably arranged in relation to the entity 110. Such known relative orientations and locations can be used in said eye-tracking function to determine a current gaze point GP using per se well-known transformations.

For the calibration method steps described herein, a visual feature 111 is used (see FIG. 2 and below). The feature 111 is a visually distinct object, shape or pattern temporarily or permanently displayed on the entity 110. The feature 111 may be displayed in said main viewing plane of the entity 110. The feature 111 has a physical size dimension 117, on the entity 110, which is known (or made known) to the computer 130. This physical size dimension 117 may be a width, a height or a diameter of the feature 111 or a predetermined part of the feature 111, or any other suitable size dimension 117. The physical size dimension 117 is a dimension being measurable in a reflection of the feature 111 in the eye 11 of a user 10 looking at the feature 111. Hence, the physical size dimension 117 is either measured perpendicularly to a gaze direction of such user 10, or is rotationally transformed de-pending on the gaze direction so as to represent a size measure perpendicularly to the gaze direction, as the case may be. In FIG. 2, the physical size dimension 117 is selected to be a horizontal width of the feature 111.

Figure 4:
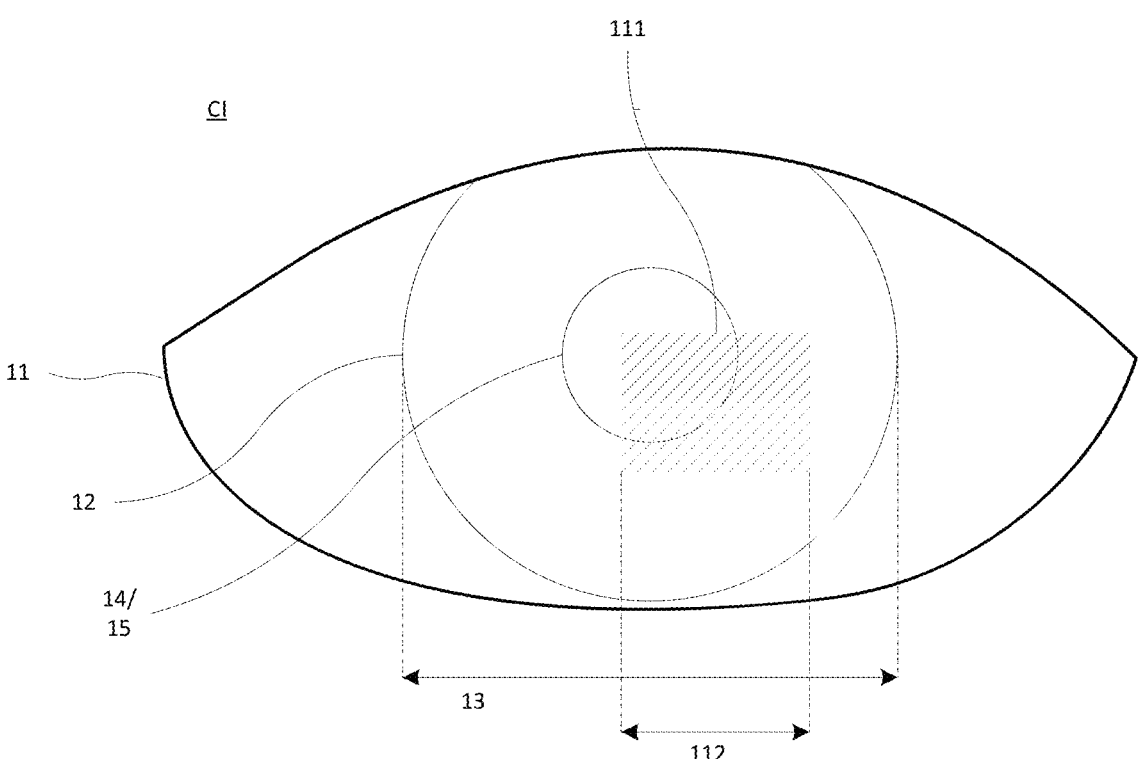
FIG. 4 illustrates a simplified calibration image containing an eye of a user, the eye in turn containing a reflection of a visual feature.

FIG. 4 shows an eye 11 of the user 10 as depicted by the digital camera 120 in a digital calibration image CI, the image CI depicting the limbus 12 of the cornea and the pupil 15. FIG. 4 also shows a reflection of the feature 111 in the eye 11. FIG. 4 illustrates an in-image feature dimension 112 (measured in the unit of calibration image CI pixels), corresponding to the physical size dimension 117 (in this example, the horizontal width) of the feature 111 illustrated in FIG. 2. An in-image limbus dimension 13 (in this case the diameter of the limbus 12) is also illustrated in FIG. 4. As is the case for the in-image feature dimension 112, the in-image limbus dimension 13 is also measured in the unit of calibration image CI pixels.

In FIGS. 2 and 4, the feature 111 is exemplified as a rectangle. It is, however, possible to use more complex shapes or patterns for the feature 111. This may be useful at least for the computer 130 to be able to automatically determine, using per se conventional digital image processing, whether or not a structure observed in a depicted image constitutes a feature 111 of the present type. This may, for instance, be used in an automatically triggered configuration step as described below, where the computer 130 is arranged to trigger a configuration procedure in case a feature 111 of the present type is detected as a reflection in the eye 11 of a depicted user 10.

Figure 5:
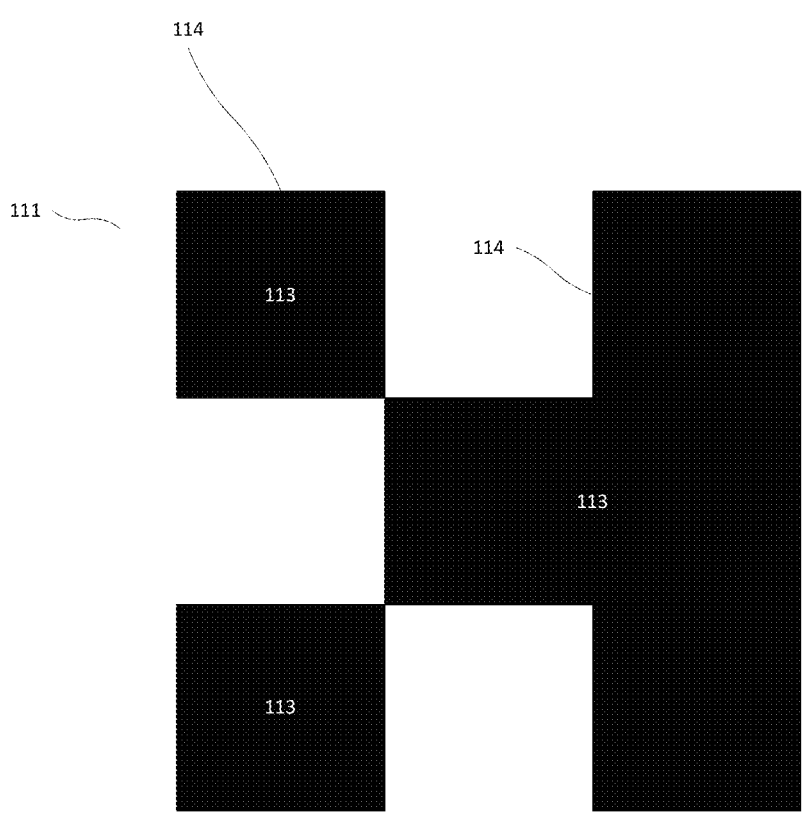
FIG. 5 illustrates an exemplary visual feature in the form of a coarse pattern.

FIG. 5 illustrates an example of such a feature 111, in the form of a distinct QR code-like shape. The feature comprises a pattern that is "coarse" in the sense that it lacks details too fine to be discernible (or at least comprises details that are coarse enough to in fact be discernible) in a depicted digital calibration image CI showing the feature 111 as a reflection in the user's 10 eye 11, during calibration of a type as described herein. It is realised that such determination of "coarseness" will depend on the specifications of the digital camera 120; a distance between the digital camera 120 and the first user 10; lighting conditions; and so forth. Preferably, the pattern comprises no discerned details that are finer than 10 cm on the entity 110.

Apart from a QR-code like patterns, ArUco, ARToolKit, ARTag, ApriTag or other similar patterns with coarse structure may also be useful.

As illustrated in FIG. 5, the pattern may comprise a number of fields 113, visually defined using contrasting colours. In the present example, there are six square such black fields 113 (out of nine possible ones in the type of pattern used) against a white background (defining the three non-black squares and potentially also an enclosing background). In different embodiments the number of such fields 113 may at least vary between 2 and 10. The relative arrangement of the fields 113, in relation to each other, may be used to define a predetermined pattern that the computer 130 is specifically arranged to discern so as to determine that the observed reflection of the pattern is indeed the feature 111. It is realised that the pattern may be static or arranged to vary over time. In case the pattern varies over time, information about such variation is made known to the computer 130.

The feature 111 may be a rectangular shape with straight, sharp edges 114, or may be in the form of a known generally coarse pattern of the described type, comprising fields 113 that in turn have straight, sharp edges 114. This provides for a feature 111 that is easily discernible as a reflection in the eye 11 of the user 10.

In some embodiments, the feature 111 constitutes the entire screen 116 of a display 115, the display 115 constituting or being comprised in the entity 110. Then, the feature 111 may be in the form of the screen 116 displaying a uniform colour, such as white or at least a colour that has high contrast in relation to the non-screen parts of the display 115.

In this and other embodiments, the feature 111 may be displayed as a static graphical structure or pattern; or it may be displayed as a time-varying graphical structure or pattern. For instance, a colour of the feature 111 may be varied over time in a predetermined manner so that the computer 130 can use information about such variations in order to automatically be able to discern the feature 111 in a series of consecutive images provided from the digital camera 120. For instance, by varying the colour of a full-screen feature 111 over time between different uniform colours having high contrast in relation to each other, such as switching between black and white, makes the method independent of a colour of non-screen parts of the display 115.

The physical feature dimension 117 may be at least 10 cm, such as at least 20 cm.

In general, the feature 111 may be arranged to cover at least 50%, such as at least 70%, of the entity 110, and more particularly of a side of the entity 110 facing the first user 10 when the calibration image CI is captured. Furthermore, the feature 111 may be arranged to have a high contrast (such as at least a 1:10 different in brightness) in relation to other parts of the entity 110. Alternatively, the feature 111 may cover 100% of the entity 110 and have a high brightness (such as sufficient brightness to be discernible as a reflection in the cornea of the first user 10 in the calibration image CI). An example of the latter is when the feature 111 covers the whole electronic computer screen 116 of a laptop computer.

It is also generally preferred that the feature 111 comprises at least one high-contrast field that has a high contrast ("high contrast" as described above) in relation to another field of the feature 111 and/or in relation to a non-feature part of the entity 110 (such as a display 115 frame), and/or that the feature 111 comprises at least one high-contrast field that has high contrast (again, "high contrast" as described above) in relation to a pupil and/or iris of the first user. For instance, a white field would have high contrast both to a dark/black display 115 frame and also to the pupil and an iris of an eye 11.

Figure 6:
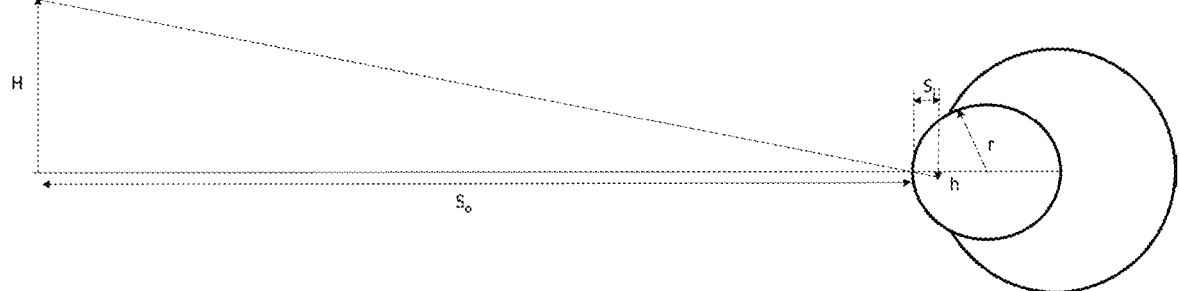
FIG. 6 illustrates an optical relationship with respect to an eye of a user.

FIG. 6 illustrates the geometry of the digital camera 120 in relation to the eye 11.

The cornea is approximately a spherical mirror with reflectivity p of 2%, given by the Fresnel reflection:

$$\rho = \left( \frac{(n-1)}{(n+1)} \right)^2,$$

where it generally holds that n=1.34 for the cornea.

A spherical mirror with radius r has a focal length f of r/2. If we define (see again FIG. 6) H to be the physical feature dimension 117 and h the virtual image size of the same dimension as reflected in the eye 11, the magnification h/H of the cornea is given by:

$$m = \frac{f}{f - s_0}.$$

Negative values of m imply an inverted image. As mentioned above, $S_o$ is the distance to the entity 110. Typically, for broad human populations in general, the cornea radius of curvature is 7.8 mm. $S_i$ is the distance to the virtual image from cornea apex.

Since the limbus diameter is almost constant (11.78+/− 0.43 mm) for broad human populations, we can calculate the feature 111 reflection size in mm, by:

$$h = \text{limbus\_diameter} \cdot \frac{\# pix}{\# PIX};$$

Where the limbus diameter is the physical limbus 12 size dimension; #pix is the in-image feature dimension 112, as measured in pixels of the depicted calibration image CI processed by the computer 130; and #PIX is the in-image limbus dimension 13, also measured in pixels of the same depicted calibration image CI (see FIG. 4).

Figure 7:
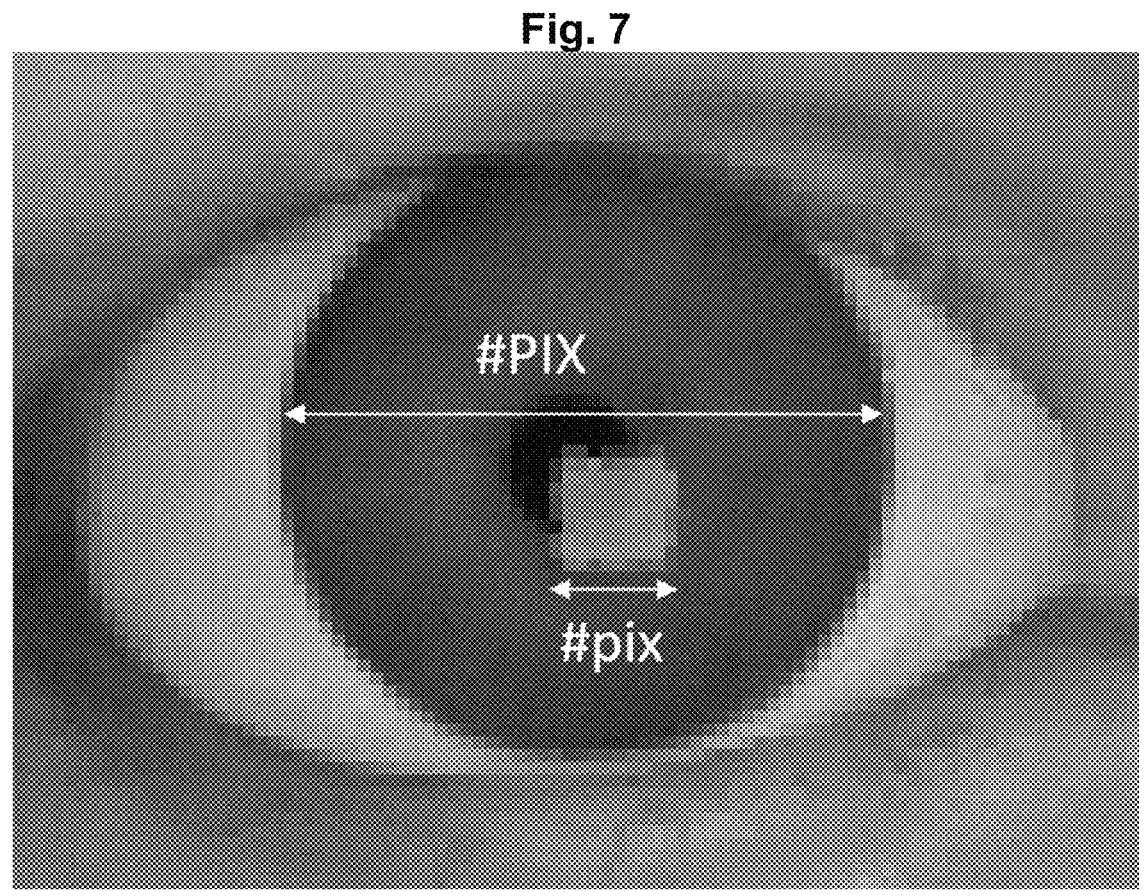
FIG. 7 is a first exemplary calibration image containing an eye of a user, the eye in turn containing a reflection of a visual feature.

FIG. 7 shows an actual depicted image, including the limbus and the feature reflection, as seen by a webcam at a distance of 300 mm, the webcam having a resolution of 720p and a horizontal field of view of 40°.

The distance between the digital camera 120 and the eye 11 is:

$$S_o = f - \frac{f}{m} = \frac{r}{2} - \frac{r}{2 \cdot m} = \frac{r}{2} \left( 1 - \frac{H}{h} \right),$$

where h/H=m.

The following table provides, as an illustrative example, horizontal widths and vertical heights of in-image feature 111 reflections in the case where the entire screen 116 of a display is used as the feature 111. The information is provided for several different viewing distances $S_o$ (measured in meters) and for three different standard display 115 sizes, namely for a 14.0 inch display (screen/feature width=310.4 mm; screen/feature height=174.3 mm); a 15.6 inch display (width=345.9 mm; height=194.3 mm); and a 17.3 inch display (width=383.6 mm; height=215.4 mm). Values are provided for the commonly used aspect ratio 16:9. The cornea radius used is 7.8 mm, and the focal length of the cornea is 3.9 mm:

| | | 14.0-inch display | | 15.6-inch display | | 17.3-inch display | |
|---|---|---|---|---|---|---|---|
| Distance | m = f/(f − $S_o$) | width | height | width | height | width | height |
| 0.2 | −0.01989 | 6.17 | 3.47 | 6.88 | 3.86 | 7.63 | 4.28 |
| 0.3 | −0.01317 | 4.09 | 2.30 | 4.56 | 2.56 | 5.05 | 2.84 |
| 0.4 | −0.00985 | 3.06 | 1.72 | 3.41 | 1.91 | 3.78 | 2.12 |
| 0.5 | −0.00786 | 2.44 | 1.37 | 2.92 | 1.53 | 3.02 | 1.69 |
| 0.6 | −0.00654 | 2.03 | 1.14 | 2.26 | 1.27 | 2.51 | 1.41 |
| 0.7 | −0.00560 | 1.72 | 0.98 | 1.94 | 1.09 | 2.15 | 1.21 |
| 0.8 | −0.00490 | 1.52 | 0.85 | 1.69 | 0.95 | 1.88 | 1.06 |
| 0.9 | −0.00435 | 1.35 | 0.76 | 1.51 | 0.85 | 1.67 | 0.94 |
| 1 | −0.00391 | 1.22 | 0.68 | 1.35 | 0.76 | 1.52 | 0.84 |
| 1.1 | −0.00356 | 1.10 | 0.62 | 1.23 | 0.69 | 1.36 | 0.77 |
| 1.2 | −0.00326 | 1.01 | 0.57 | 1.13 | 0.63 | .125 | 0.70 |

For a user 10 of a conventional laptop computer, a typical distance between the eye 11 and the display 115 of the laptop computer is about 50 cm. The image (as seen in the reflection in the eye 11) of the display screen size at that distance between 2.44×1.37 mm and 3.0×1.69 mm, for the different types of screens shown in the above table. The pupil 15 size is typically 4 mm in diameter. If the image of the screen 116 (in this example, the feature 111) is seen within the dark pupil 15, the feature 111 is straight-forward to detect, and its in-image size 112 to measure in the calibration image CI. If the feature 111 is a uniform, white field, good contrast is achieved even to different iris colours.

The magnification of the digital camera 120 is given by:

$$M = \left| \frac{f_2}{f_2 - s_0} \right|,$$

which is then:

$$f_2 = \left| \frac{M \cdot S_0}{M - 1} \right|,$$

where $f_2$ is the focal length of the digital camera 120; M is the magnification of the digital camera 120, taking the absolute value for a positive focal length of inverted images.

Since $S_o$ is known from the ratio of the physical limbus diameter and the feature 111 reflection from the calibration image CI depicting the eye 111, the digital camera 120 magnification M is:

$$M = \frac{\#PIX \cdot \text{pitch}}{\text{limbus\_diameter}},$$

Where pitch is the pixel pitch (actual physical size, such as width in meters, of each pixel on the light sensor of the digital camera 120, for conventional sensors about 1 μm).

From this, the focal length of the digital camera 120 may be calculated in units of pixel pitch according to the following:

$$\frac{f_2}{\text{pitch}} = \frac{\#PIX}{\text{limbus\_diameter}} \cdot S_o, \text{ using}$$

$$\frac{\#PIX \cdot \text{pitch}}{\text{limbus\_diameter}} \sim 0.001 \ll 1.$$

Figure 10A:
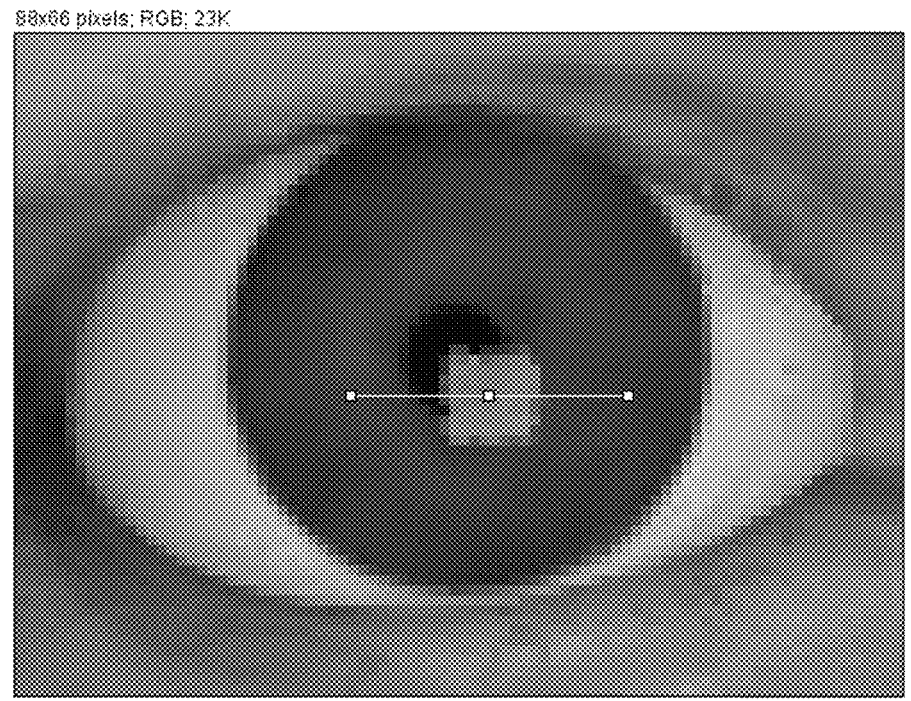
FIG. 10$a$ is a second exemplary calibration image containing an eye of a user, the eye in turn containing a reflection of a visual feature.
Figure 10B:
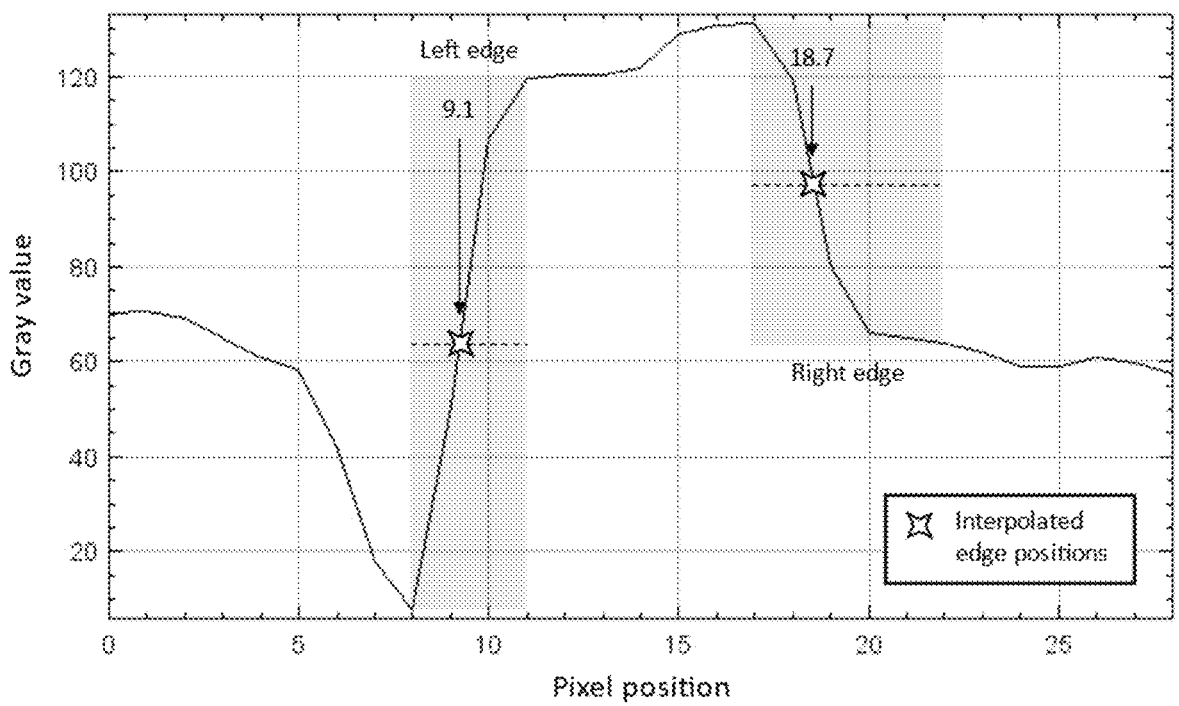

The value for #PIX may be measured in several consecutive depicted images, received by the computer 130 from the digital camera 120, and averaged to achieve sub-pixel resolution. Sub-pixel resolution may for example be achieved by interpolating between pixels in one single image as discussed with respect to FIG. 10*b*.

Once the focal length in units of pitch for the digital camera 120 is known, it is possible to use this information during eye-tracking using that same digital camera 120. It is specifically noted that the determination of the digital camera 120 focal length as exemplified above does not require the user 10 to be at any particular exact distance from the entity 110 or feature 111 (even if it is preferred that a distance between the eye 11 of the first user 10 and the digital camera 120 is between 30 and 80 cm during calibration, and in particular when the calibration image CI is produced); that the eye-tracking does also not require the user 10 to be at the same distance from the digital camera 120 as during calibration of the digital camera 120; and that the entity 110 used for calibration does not need to be the same entity 110 as used for eye-tracking. It is also noted that the calibration information with respect to the digital camera 120 determined in the way described herein is useful for eye-tracking also for a different user than the user 10 in relation to whom the calibration was performed. In other words, the calibration may be performed once, or at sparse or uneven intervals, the gained calibration information can be associated to the digital camera 120 and stored by the computer 130. Then, it may be used in eye-tracking using that same digital camera 120 for several different users and under varying conditions in terms of physical orientation of digital camera 120, entity 110 and user 10; and lighting.

In general, the focal length of the digital camera 120 in units of pitch can be used to determine an angular field of view for the digital camera 120, which in turn may be used to calculate a distance between the eye 11 and the digital camera 120 during eye-tracking.

If the field of view angle is 20, then f tan(θ)=n·pitch, if n is the number of pixels from the centre of the digital camera 120 sensor along its x or y axis. Hence:

$$\theta = \tan^{-1}\left( \frac{n}{f_2/\text{pitch}} \right).$$

In order to, during eye-tracking, determine a gaze point on the entity 110, the distance $S_o$ between the eye 11 and the entity 110 is used in combination with a current horizontal/vertical rotation of the eye 11. The rotation may be measured in a way which is conventional per se within the field of eye-tracking, whereas the distance $S_o$ may be determined as exemplified above or differently (see below).

The gaze point GP may be determined using a conventional pinhole camera model to translate digital camera 120 coordinate system in pixels to real-world coordinate system in meters (see, for instance, https://en.wikipedia.org/wiki/pinhole camera model), using the determined gaze distance $S_o$ and the determined gaze angle.

It is hence realised that there is no requirement to know the actual pitch of the digital camera 120 in order to be able to determine (with sufficient precision for eye-tracking use in practical applications) the field of view angle of the digital camera 120.

Figure 8:
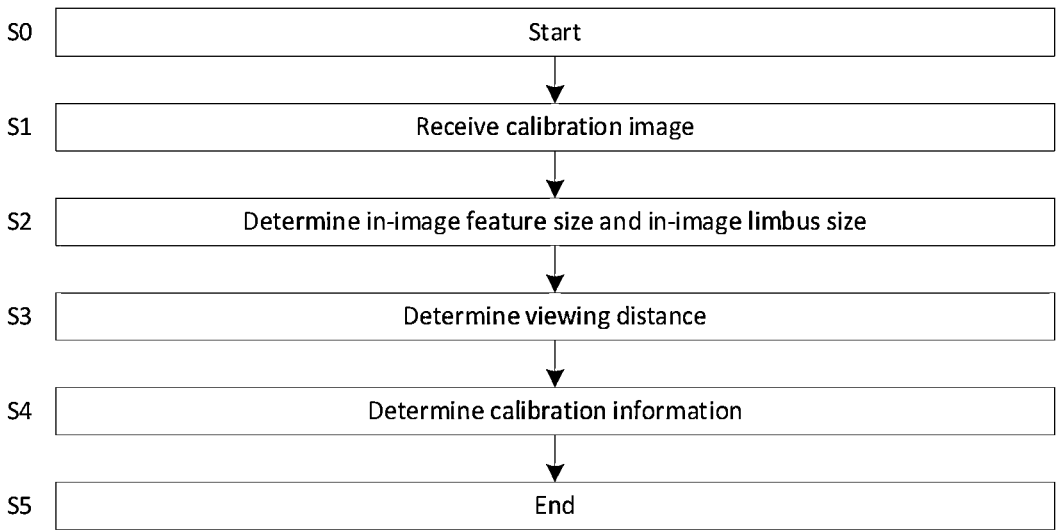
FIG. 8 is a flowchart showing a sequence of calibration method steps.

FIG. 8 is a flowchart illustrating a method according to the present invention, for determining calibration information in relation to the digital camera 120. The method is performed by the system 100 and preferably specifically by the computer 130. As mentioned above, a computer program product according to the present invention may be executed on the computer 130 so as to perform these and other method steps.

As discussed above, the digital camera 120 is used to depict a particular user 10, herein denoted a "second user", during eye-tracking of the user 10 in question, and the depiction (a tracking image TI) is used in or by the system 100 for determining a gaze point GP of the second user 10 in relation to the entity 110. To the contrary, the above-discussed user 10 being depicted during the calibration of the digital camera 120 (herein denoted a "first user") may be a different user than the second user. In some embodiments, however, the first user is the same user 10 as the second user.

In a first step S0, the method starts.

In a subsequent calibration image reception step S1, the system 100 (such as the computer 130) receives from the digital camera 120 at least one calibration image CI, being a depiction of at least one eye 11 of the first user 10. Step S1 may also comprise the digital camera 120 performing the depicting (capturing the calibration image CI), such as upon instructions received from the computer 130 to do so.

In a subsequent calibration image processing step S2, the computer 130 performs digital image processing on the calibration image CI to locate and determine the in-image feature size dimension 112 (measured in pixel units) of the entity 110 feature 111. It is noted that said feature 111 appears in the calibration image CI as a reflection in the first user's 10 eye 11.

In step S2, the computer also locates the limbus 12 of the eye 11 and determines the in-image limbus size dimension 13 in pixel units.

The digital image processing may be performed using per se well-known and conventional procedures. For instance, a general location in the configuration image CI of the sought-after image subparts may be determined using a face-recognition algorithm, in turn providing a location of the eye 11 in the configuration image CI.

Once the location of the eye 11 has been determined in the calibration image CI, there are several possible ways to determine said in-image size dimensions 13, 112.

One example is to find vertical edges, for instance using a Sobel filter or using a simpler gradient filter that preserves left/right edge direction (the direction information can be used to determine if each identified edge pixel is a left-side edge or a right-side edge pixel in relation to the feature 111).

Then, any set of at least a minimum number (such as 2) of adjacent pixels that occur along any vertical line and being determined to qualify as edge pixels may be noted and used to identify an edge line. Alternatively, a line detection can be performed using a Hough Transform. Edge detection may be performed both vertically and horizontally, in order to find and identify rectangular features 111.

Another example is to perform a feature detection for an a priori known target pattern (such as a rectangle or a coarse pattern of the above-described type). This can be done by finding corners, using for instance a Harris Corner Detection algorithm. Then, standard feature matching algorithms, such as ORB, SIFT, FLANN, etc., can be employed to identify and localise the feature 111 pattern.

In yet another example, an open feature detection may be performed, designed to detect a priori unknown target patterns. Such an algorithm may detect any feature 111 that is sufficiently large and having sufficient contrast against an image background to be discernible in the calibration image CI as reflected in the eye 11. Once identified, the detected feature 111 may be analysed in various ways, as will be described below.

In a subsequent calculation step S3, the computer 130 determines a current distance $S_o$ between the eye 11 of the first user 10 and the entity 110 based on the following metrics:

The determined in-image feature size dimension 112 (in units of pixels);

The in-image limbus size dimension 13 (in units of pixels);

The curvature of the cornea of the eye 11 of the first user 10 (in units of meters);

A physical limbus size dimension of the eye 11 of the first user 10 (in units of meters); and A physical size of the feature 111 (in units of meters).

The latter three pieces of information may be a priori known by the computer 130 or may be provided to the computer 130 as a part of the present method. It may also be estimated by the computer 130 as will be described below.

In practise, the distance $S_o$ may be calculated as has been exemplified above. It is realized that the in-image features size dimension 112 and the in-image limbus size dimension 13 are measured as a part of step S2, whereas the curvature of the cornea and the physical limbus size may be previously known or estimated and may be implicitly used in the form of constants in any equations employed to perform the calculations. The physical size of the feature 111 may be determined based on not only the shape and other visual characteristics of the feature 111 itself, but also based on a size and/or pixel resolution of the display 115 or corresponding displaying the feature 111.

For instance, the following equation may be used to calculate $S_o$:

$$S_o = \frac{r}{2}\left(1 - \frac{H}{\text{limbus diamter}\frac{\#\,pix}{\#\,PIX}}\right).$$

In a subsequent calibration information determination step S4, the calibration information is determined in the form of a focal length and/or a field of view of the digital camera 120.

This determination may also be as exemplified above and is specifically performed based on the current distance $S_o$ between the eye 11 of the first user 10 and the entity 110 determined in step S3, and further based on the physical limbus size dimension 13. The focal length of the digital camera 120 may be measured in units of digital camera 120 pitch, as explained above.

The determined calibration information may be stored in any suitable format, directly or indirectly (but unambiguously useful in a preceding eye-tracking method of the below type), by the computer 130.

In a subsequent step S5, the method ends.

Thereafter, the determined calibration information may be used as input to an eye-tracking method as described in the following, for detecting a current gaze point GP of a second user onto an entity 110. The calibration method (above) and the eye-tracking method (below) may together constitute a combined calibration and eye-tracking method according to the present invention.

Figure 9:
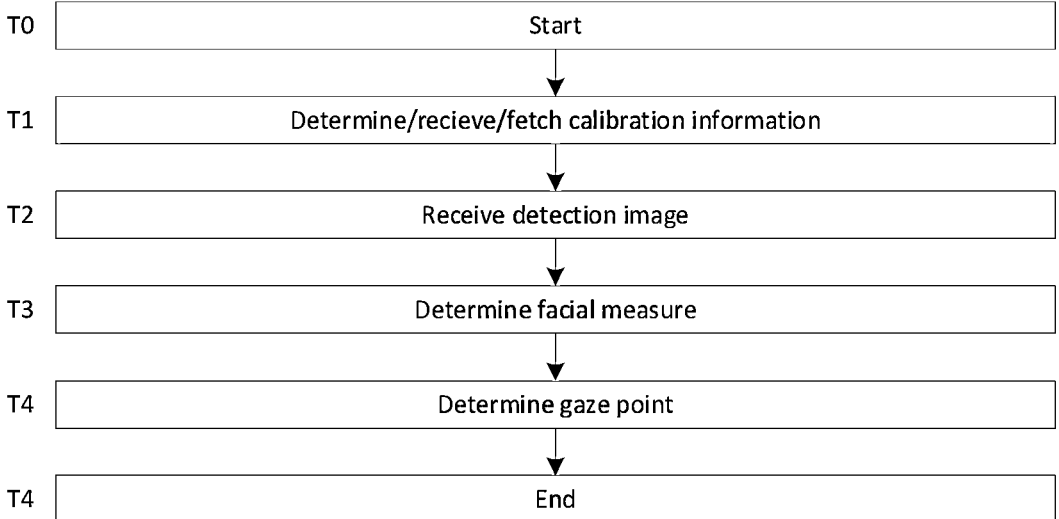
FIG. 9 is a flowchart showing a sequence of eye-tracking method steps.

Such an eye-tracking method is illustrated in the flowchart shown in FIG. 9.

Hence, in a first step TO, the method starts.

In case this has not already been performed, in a subsequent calibration determining step T1 calibration information in relation to a digital camera 120 to be used for the eye-tracking is determined, in the general way described above; received; or fetched from storage.

In a subsequent tracking image reception step T2, at least one tracking image TI, being a depiction of at least one eye 11 of the second user 10, is received by the computer 130 from the digital camera 120. In some embodiments, the digital camera 120 produces the tracking image TI upon request from the computer 130. It is realised that, in a practical application, a continuation of consecutive tracking images TI will typically be provided from the digital camera 120 to the computer 130 for continuously tracking the movements of a gaze point GP onto the entity 110.

In a subsequent tracking image processing step T3, the computer 130 performs digital image processing on the tracking image TI to locate and determine a facial measure, of a facial feature 14 of the second user 10, the facial feature 14 being visible in said tracking image TI.

The facial feature 14 may be the reflection of a known-sized visual feature seen in the cornea of the second user 10, the visual feature being the same or similar to the feature 111 and the facial measure may then be a size measure of said reflection in a way corresponding to what has been described above in relation to the determining of the calibration information; the facial feature may be a face landmark, such as a nose, a jaw or a temple, and the facial measure may then be a predetermined measure of or related to this landmark; or the facial feature may be a limbus or sclera of the second user's 10 eye 11, and the facial measure may then be a size measure of said limbus or sclera. However, other facial features are known and can be used.

The facial measure, being selected since its physical size is or is made known to the computer 130, is measured in relation to a field of view of the digital camera 120, with the purpose of calculating a viewing distance $S'_o$ (see FIG. 3) between the digital camera 120 and the eye 11 of the second user 10 during eye-tracking of the second user 10.

In a subsequent gaze point determination step T4, the current gaze point GP (onto the entity 110) of the second user 10 is detected based on the following information:

A detected gaze direction of the second user 10, that may be detected in a way which is per se conventional in the field of eye-tracking;

Said determined facial measure;

The calibration information determined as explained above for the same digital camera 120 as used for the eye-tracking of the second user 10; and A known spatial interrelationship between the digital camera 120 and the entity 110.

Some eye-tracking approaches uses machine learning/deep learning in the sense that a convolutional neural network is calculating the gaze direction based on a depiction of the entire face of the second user 10. For instance, the gaze direction determination may be based on a combination of head rotation, sclera, eyelid and/or pupil position, determined by such a neural network. Hence, this approach uses one or several "facial measures" in order to determine a current gaze direction. The present invention preferably uses a "facial feature" to detect a distance between the digital camera 120/entity 110 and the eye 10 in question.

In practise, the gaze point GP determination for the second user 10 may be performed by first determining a current distance $S'_o$ between the eye 11 of the second user 10 and the entity 110, the determination of this current distance $S'_o$ being based on said determined facial measure, said calibration information and said spatial interrelationship between the digital camera 120 and the entity 110. Then, the current gaze point GP of the second user may be determined based on said detected gaze direction of the second user 10 and said current distance $S'_o$. These determinations, in turn, are made using per se well-known calculations based on a pinhole model (referenced above). Such calculations use scaling factors of said facial features. For instance, such calculations, are explained Linden, E, et al., "Learning to Personalize in Appearance-Based Gaze Tracking", IEEE International Conference on Computer Vision, 2019, article id 19432608, doi: 10.1109/ICCVW.2019.00145.

It is particularly noted that $S_o$ and $S'_o$ may have different values.

In a subsequent step T4, the method ends.

As explained above, the in-image feature size dimension 112 and/or said in-image limbus size dimension 13 may be determined using an edge detection step or feature detection step, being applied to the individual pixels of the calibration image CI. In some embodiments, such determination may use an interpolation, such as a linear interpolation, between intensity measures of individual adjacent pixels in the calibration image CI. This makes it possible to reach sub-pixel precision in determining a location of an edge of the feature 111 and/or the limbus 12 in the calibration image CI. This is exemplified in Figures showing an exemplary calibration image with the reflection of the feature 111 and a white line illustrating a sweep path used for edge detection, and 10b, showing on its horizontal axis an in-image distance in pixel units and on its vertical axis greyscale intensity pixel values. The grey rectangles indicate the pixels belonging to each edge, respectively, as determined by a preceding coarse edge-detection, thresholding, or some other set of criteria that selects two or more pixels per edge. From the selected pixels, the halfway level between their max and min value is defined for each edge (shown as dashed lines). The positions at which the interpolated greyscale intensity crosses these halfway levels yields the edge locations. In the more general case, interpolation is used so as to detect the location of the edge in question with sub-pixel resolution, in FIG. 10b exemplified by a left edge detected at pixel location 9.1 and a right edge located at pixel location 18.7. For instance, a 50% rise point may be interpolated along a horizontal or vertical profile over the edge in question.

Measurements from several consecutively captured calibration images CI showing one and the same first user 10 and one and the same reflected visual feature 111 may additionally, or alternatively, be used to reach sub-pixel resolution, for instance by forming an average feature size dimension 112 based on measurements from several such consecutive calibration images CI.

The present calibration method may be triggered in various ways. One alternative is that the feature 111 is deliberately displayed or shown on the entity 110, such as on the screen 116, as a part of a digital camera calibration information determining step. It may be the computer 130 that deliberately instructs the entity 110 to display or show the feature 111. In such cases, the computer 130 may inform the first user 10 that the digital camera is to be calibrated and urge the first user 10 to sit about 0.5 m from the display 115 (or other type of entity 110). Then, the computer 130 may cause the display 115 to display, on the screen 116, the predetermined visual calibration feature 111, such as in the form of a completely white, bright full screen 16. The computer 130 may then cause the digital camera 120 to capture a calibration image CI, and the process proceeds as described above.

In other embodiments, the digital camera 120 may be instructed, such as by the computer 130, to capture a series of calibration images CI, such as at regular or irregular time intervals, for instance at least one calibration image CI per hour or if/when poor eye-tracking accuracy is detected (either automatically by the computer 130 or manually by the user 10). Then, each captured calibration image CI is communicated from the digital camera 120 to the computer 130, and the computer 130 determines whether or not the calibration image CI contains a feature 111 that can be discerned by the computer 130 using suitable digital image processing.

For instance, when using an ordinary personal computer many users 10 tend to frequently use white backgrounds and a high-contrast foreground colour, such as black. One example is word processing in full-screen mode, where the background is white and text is frequently displayed in a dark colour, such as black. Many times, the background involves considerably more pixels than the foreground, as is again the case in many full-screen word processing situations. Therefore, during normal use of the entity, the predominantly brightly coloured screen 116 may provide a high-contrast shape as a result of its normal use, in the sense that darker-coloured foreground pixels fade away in the reflection of the first user's 10 eye 11 since they cover such a relatively small total portion of the screen 116 as compared to the background pixels.

This way, the calibration may be based on a calibration image not disclosing the feature 111 in the form of a deliberately displayed geometric pattern, but rather identifying the feature 111 as a geometric pattern accruing on the entity 110 as a result of normal use of the entity 110 by the first user 10.

Hence, the computer 130 may look for a feature 111 being constituted by the screen 116 showing a generally bright full screen background B with only a small number of pixels constituting a foreground F (the latter may not even be visible in the calibration image CI), and the method may then comprises controlling the digital camera 120 to depict said at least one eye 11 of the first user 10 repeatedly to produce a series of calibration images CI; and the feature 111 may be automatically being detected, using digital image processing, as a present, generally rectangular, bright reflected shape in said eye 11 in at least one of the hence produced calibration images CI. The detection of an acceptable such calibration image CI may then trigger the calibration procedure, using the acceptable calibration image CI in question.

Figure 11:
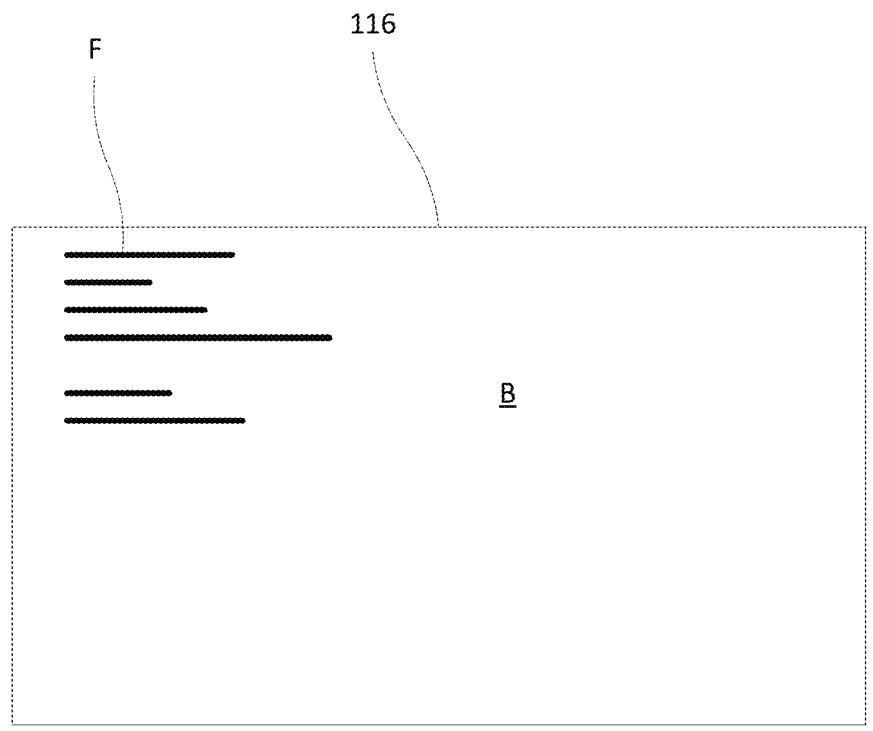
FIG. 11 shows a computer screen having foreground and background pixels.

This is illustrated in FIG. 11, showing the screen 116 having a generally white background B with only small amounts of black foreground text F.

In case the computer 130 controls the screen 116 contents, for instance in case the display 115 is a display used by the first user 10 together with the computer 130 to perform word processing or similar, the computer 130 can analyse the graphical screen 116 contents continuously and instruct the digital camera 120 to capture a calibration image CI whenever a sufficiently homogenous high-contrast rectangle fills the entire screen 116.

In other embodiments, a trained neural network may be used to monitor a series of calibration images CI of the above-discussed type and to automatically detect an occurring discernible feature 111. The neural network in question may be trained using a set of possible screen 116 images occurring during use of at least one computer, the training set being associated with information regarding whether or not the screen 116 contents can be used as a discernible visual feature 111 when viewed as a reflection in the eye of a suitably seated first user 10.

A trained neural network may also be used, in these and other embodiments, for detecting a face or facial features of the first user 10, and/or the feature 111, in the calibration image CI and to determine a position and/or size of a feature 111 pattern found in the calibration image CI.

The computer 130 may be arranged to passively monitor calibration images CI received from the digital camera and to automatically trigger a digital camera 120 calibration when predetermined or dynamically determined conditions are met. Such conditions may include a sufficiently large and contrasting feature 111 to be discernible in the calibration image CI in question; lighting conditions in the calibration image CI; a size of a depicted face of the first user 10 in the calibration image CI; and so forth. The determination may be performed in the consecutively performed steps of first determining that the necessary conditions are met and then to perform a detection and evaluation of the feature 111 in the calibration image 111.

Hence, one and the same digital camera 120 may be calibrated only once, or several times, such as whenever possible using such a passively monitoring computer 130. In case several calibration results exist for one and the same digital camera 120, such results may be jointly used to produce improved calibration results, such as using a moving average value of used calibration information parameters for the digital camera 120 in question.

As mentioned, the limbus size and cornea curvature do not differ much across different human populations. Therefore, the present inventors have discovered that it is possible to use estimated values for these metrics and achieve adequate calibration results. However, there are of course minor variations across populations. Since these variations to some extent correlate with other facial features in same persons, it is possible to use a trained neural network to determine an expected limbus size dimension and/or an expected cornea curvature (such as cornea reflection focal length) based on the calibration image CI, the calibration image CI in turn depicting the face of the first user 10. Such a trained neural network may then have been trained using a training set of images portraying faces of humans from different human populations, the training set being associated with measured limbus sizes and/or cornea curvatures.

If such expected limbus size dimension and/or expected cornea curvature is determined, these values can then be used as the above-discussed physical limbus size dimension or cornea curvature, respectively.

Above, preferred embodiments have been described. However, it is apparent to the skilled person that many modifications can be made to the disclosed embodiments without departing from the basic idea of the invention.

For instance, the eye-tracking itself may comprise numerous features in addition to the ones described herein. The present inventors foresee particular benefits in video conference solutions using eye-tracking based on the same digital camera 120 used to film the user 10 participating in the video conference in question. Then, the digital camera 120 can be calibrated one time and/or in the beginning of each video conference session in any of the ways described above, such as manually triggered or using an automatic calibration based on the video conference solution presenting a full-screen view that can be used as the visual feature 111.

The computer 130 may be a stationary, portable or hand-held computer, such as a work-station, a laptop or a smartphone, the latter potentially having a front digital camera 120 used for eye-tracking.

The various image processing steps described herein may take place in many ways, where the ones described in detail are only provided as examples. Correspondingly, the calculations described to determine the calibration information may be adjusted and rewritten in various ways without departing from the scope of the enclosed claims.

In general, all which has been said herein regarding the method is equally applicable to the said system and computer program product, and vice versa.

Hence, the invention is not limited to the described embodiments, but can be varied within the scope of the enclosed claims.

The invention claimed is:

1. Method for determining calibration information in relation to a digital camera, the digital camera being used to depict a second user in a system for determin-ing a gaze point of the second user in relation to an entity, the method comprising:
  receiving from the digital camera at least one calibration image, being a depiction of at least one eye of a first user, wherein the first user may be the same as or different from the second user;
  performing digital image processing on the calibration image:
  to locate and determine an in-image feature size dimen-sion of a feature of the entity as reflected in said eye of the first user;
  to locate a limbus of said eye of the first user; and
  to determine an in-image limbus size dimension of said limbus;
  determining a current distance between the eye of the first user and the entity based on said in-image feature size dimension, said in-image limbus size dimension, a curvature of the cornea of the eye of the first user, a physical limbus size dimension of the eye of the first user and a physical size of the feature; and
  determining said calibration information in the form of a focal length and/or a field of view of the digital camera based on said current distance and said physical limbus size dimension.

2. Method for detecting a current gaze point of a second user on an entity, the method comprising:
determining calibration information with respect to a digital camera, the deter-mining of calibration infor-mation being in accordance with claim 1;
receiving from the digital camera at least one tracking image, being a depiction of at least one eye of the second user;
performing digital image processing on the tracking image to locate and deter-mine a facial measure, of a facial feature of the second user, the facial feature being visible in said tracking image; and
detecting said current gaze point of the second user based on a detected gaze di-rection of the second user, said facial measure, said calibration information and a spa-tial interrelationship between the digital camera and the entity.

3. Method according to claim 2, further comprising:
determining a current distance between the eye of the second user and the entity based on said facial measure, said calibration information and a spatial interrelation-ship between the digital camera and the entity; and wherein
the current gaze point of the second user is determined based on said detected gaze direction of the second user and said current distance between the eye of the second user and the entity.

4. Method according to claim 2, wherein
said facial measure is selected from a group: a corneal reflection, a face landmark, an inter-pupil distance, a limbus size, and a sclera size.

5. Method according to claim 2, wherein
said in-image feature size dimension and said in-image limbus size dimension are both measured in terms of a number of pixels of the calibration image.

6. Method according to claim 5, wherein
said digital image processing performed on the calibration image comprises an edge detection step or feature detection step using interpolation between intensity measures of individual adjacent pixels in the calibration image so as to detect the in-image feature size dimen-sion and/or said in-image limbus size dimension with sub-pixel precision.

7. Method according to claim 2, wherein
said physical limbus size dimension is a physical distance, such as expressed in mm.

8. Method according to claim 2, wherein
the feature covers at least 50% of the entity and has high contrast in relation to other parts of the entity, or the feature covers 100% of the entity and has high bright-ness.

9. Method according to claim 2, wherein
the feature has a rectangular shape with straight, sharp edges, or is in the form of a known coarse pattern comprising between 2 and 10 fields that in turn have straight, sharp edges.

10. Method according to claim 2, wherein
the entity is a screen of an electronic display.

11. Method according to claim 10, wherein
the feature is deliberately displayed on the screen as part of a camera calibration information determining step, or
the feature is constituted by the screen showing a gener-ally bright full screen background with only a small number of pixels constituting a foreground;
the method comprises controlling the digital camera to depict said at least one eye repeatedly to produce a series of calibration images; and the feature automati-cally being detected, using digital image processing, as a present, generally rectangular, bright reflected shape in said eye in at least one of the hence produced calibration images.

12. Method according to claim 11, wherein the method further comprises using a trained neural network, trained using a set of possible screen contents oc-curring during use of at least one computer, to perform said automatic detection of the feature.

13. Method according to claim 2, wherein the method further comprises using a trained neural network to determine an expected limbus size dimension based on the calibration image, the calibration image depicting the face of the first user; and using the expected limbus size dimension as said physical limbus size dimension.

14. Method according to claim 2, wherein a distance between the eye of the first user and the digital camera is between 30 and 80 cm when the calibration image is produced.

15. Method according to claim 2, wherein a focal plane of the digital camera is arranged in a main viewing plane of the enti-ty ±5 cm perpendicularly to said main viewing plane.

16. System for determining a gaze point of a second user in relation to an entity using a digital camera, the system comprising a calibration module, arranged to determine calibration information in relation to the digital camera by receiving from the digital camera at least one calibration image, being a depiction of at least one eye of a first user, wherein the first user may be the same as or different from the second user;

performing digital image processing on the calibration image to locate and deter-mine an in-image feature size dimension of a feature of the entity as reflected in said eye of the first user; and to locate a limbus of said eye of the first user and determine an in-image limbus size dimension of said limbus;

determining a current distance between the eye of the first user and the entity based on said in-image feature size dimension, said in-image limbus size dimension, a curvature of the cornea of the eye of the first user, a physical limbus size dimension of the eye of the first user and a physical size of the feature; and determine said calibration information in the form of a focal length and/or a field of view of the digital camera based on said current distance and said physical limbus size dimension, the system further comprising a gaze point detection module, arranged to detect a current gaze point of a second user, the second user being the first user or a different user, by receiving from the digital camera a digital tracking image, depicting at least one eye of the second user;

performing digital image processing on the tracking image to locate and deter-mine a facial measure, of a facial feature of the second user, the facial feature being visible in said tracking image; and detecting said current gaze point of the second user based on a detected gaze di-rection of the second user, said facial measure, said calibration information and a spa-tial interrelationship between the digital camera and the entity.

17. A non-transitory computer-readable medium compris-ing instructions which, when executed by a computer, cause the computer to carry out the steps of a method according claim 2.

* * * * *